(12) United States Patent
Hu et al.

(10) Patent No.: US 12,209,931 B1
(45) Date of Patent: Jan. 28, 2025

(54) LEAKAGE MONITORING DEVICE FOR PNEUMATIC DRAIN VALVE OF STEAM TURBINE

(71) Applicant: HUANENG TAIYUAN DONGSHAN GAS TURBINE COGENERATION CO., LTD., Shanxi (CN)

(72) Inventors: Guoqing Hu, Taiyuan (CN); Qinglong Kong, Taiyuan (CN); Jiajia Xu, Taiyuan (CN); Qiang Han, Taiyuan (CN); Xiaochao Zhang, Taiyuan (CN)

(73) Assignee: HUANENG TAIYUAN DONGSHAN GAS TURBINE COGENERATION CO., LTD., Taiyuan (CN)

( * ) Notice: Subject to any disclaimer, the term of this patent is extended or adjusted under 35 U.S.C. 154(b) by 0 days.

(21) Appl. No.: 18/768,105

(22) Filed: Jul. 10, 2024

(30) Foreign Application Priority Data

Dec. 6, 2023 (CN) .......................... 202311658887.9

(51) Int. Cl.
*G01M 3/24* (2006.01)
(52) U.S. Cl.
CPC ...................... *G01M 3/24* (2013.01)
(58) Field of Classification Search
None
See application file for complete search history.

(56) References Cited

U.S. PATENT DOCUMENTS

| | | | | |
|---|---|---|---|---|
| 5,947,145 A * | 9/1999 | Schlesch | ................... | F16T 1/38 137/185 |
| 8,935,126 B2 * | 1/2015 | Armstrong | ................ | F16T 1/48 702/183 |
| 2014/0090712 A1 * | 4/2014 | Karschnia | ............... | F16K 37/00 137/1 |
| 2014/0230905 A1 * | 8/2014 | Sinstedten | ................ | F16T 1/48 137/551 |
| 2018/0058255 A1 * | 3/2018 | Reigl | .................... | F01D 21/003 |

FOREIGN PATENT DOCUMENTS

| CN | 106838349 A | 6/2017 |
|---|---|---|
| CN | 207093975 U | 3/2018 |
| CN | 207162103 U | 3/2018 |

(Continued)

OTHER PUBLICATIONS

First Office Action in Chinese Application No. 202311658887.9 mailed on Jan. 12, 2024, 21 pages.

(Continued)

*Primary Examiner* — Patrick Assouad
*Assistant Examiner* — Mark A Shabman
(74) *Attorney, Agent, or Firm* — Porus IP LLC

(57) ABSTRACT

Provided is a leakage monitoring device for a pneumatic drain valve of a steam turbine. The disclosure relates to the technical field of leakage monitoring of drain valve. The device includes an additional valve body, a top flange of the additional valve body is provided with an additional sealing cover, a bucket is installed in a middle of an inner side of the additional valve body, an upper part of a left side of an outer surface of the additional valve body is fixedly connected with a water inlet pipe, a first guide cavity is vertically arranged on the inner side of the additional valve body and close to the water inlet pipe and is communicated with the water inlet pipe.

1 Claim, 10 Drawing Sheets

(56) References Cited

FOREIGN PATENT DOCUMENTS

| | | |
|---|---|---|
| CN | 207487917 U | 6/2018 |
| CN | 108980599 A | 12/2018 |
| CN | 113757549 A | 12/2021 |
| CN | 114183793 A | 3/2022 |
| CN | 215916600 U | 3/2022 |
| CN | 215985067 U | 3/2022 |
| CN | 216770933 U | 6/2022 |
| CN | 216813732 U | 6/2022 |
| CN | 217874386 U | 11/2022 |
| CN | 115560924 A | 1/2023 |
| CN | 219019262 U | 5/2023 |
| CN | 116688626 A | 9/2023 |
| CN | 116793661 A | 9/2023 |
| CN | 117006329 A | 11/2023 |
| GB | 631754 A | 11/1949 |
| GB | 795230 A | 5/1958 |
| JP | H02107897 A | 4/1990 |
| JP | 2009007845 A | 1/2009 |

OTHER PUBLICATIONS

Notification to Grant Patent Right for Invention in Chinese Application No. 202311658887.9 mailed on Jan. 26, 2024, 13 pages.

Liu, Yafeng et al., Cause Analysis and Treatment of Abnormal TSI Axial Displacement Signal of Steam Turbine, Huadian Technology, 39(8), 2017, 4 pages.

Li, Haitao, Detection of Internal Leakage of Steam Trap, Energy Conservation, 8, 2008, 3 pages.

\* cited by examiner

LEAKAGE MONITORING DEVICE FOR PNEUMATIC DRAIN VALVE OF STEAM TURBINE

CROSS-REFERENCE TO RELATED APPLICATIONS

This application claims priority of Chinese Patent Application No. 202311658887.9, filed on Dec. 6, 2023, the content of which is hereby incorporated by reference.

TECHNICAL FIELD

The disclosure relates to the technical field of leakage monitoring of drain valve, in particular to a leakage monitoring device for a pneumatic drain valve of a steam turbine.

BACKGROUND

Pneumatic drain valve is a valve driven by compressed gas or liquid, and its working principle is the same as that of electric and hydraulic drain valves. Because the pneumatic drain valve has the characteristics of small volume and light weight, it is very suitable for media with solid particles, suspended solids or high viscosity. The working principle of the pneumatic drain valve is as follows: when the fluid enters the cylinder, the piston pushes the piston rod to rotate the spindle by 90 degrees, at this time, the gas in the upper chamber of the spindle is compressed and the pressure rises; at the same time, the gas in the lower chamber of the spindle is exhausted to the atmosphere, so that the pressure difference between the upper and lower chambers will cause the piston rod to move upward in the cylinder and drive the slider to move downward, thus opening the valve.

The existing leakage monitoring device of steam turbine pneumatic drain valve is generally a hand-held leakage detector, or it can only detect the leakage at a fixed point at the water inlet pipe or water inlet tank designated by the pneumatic drain valve, but the hand-held leakage detector often needs manpower and material resources for regular monitoring, which is troublesome to use and cannot monitor the leakage situation of the additional valve body in real time. Another existing monitoring device for pneumatic drain valve cannot monitor the installation interface between installing an additional valve body and an additional sealing cover at the same time, which leads to structural monitoring loopholes in the existing monitoring device, resulting in a small monitoring range, the monitoring performance cannot keep up with the strict use requirements.

SUMMARY

In order to achieve the above objectives, the disclosure is realized by the following technical scheme: a leakage monitoring device for a pneumatic drain valve of a steam turbine is provided, which includes an additional valve body, a top flange of the additional valve body is provided with an additional sealing cover, a bucket is installed in a middle of an inner side of the additional valve body, an upper part of a left side of an outer surface of the additional valve body is fixedly connected with a water inlet pipe, a first guide cavity is vertically arranged on the inner side of the additional valve body and close to the water inlet pipe and is communicated with the water inlet pipe, a plug valve is rotatably installed at a lower left side of the outer surface of the additional valve body, and a high-pressure sealing ring is installed in a rotating connection position of the plug valve and the additional valve body; the opening and closing of the first guide cavity is independently controlled by rotating 90 degrees counterclockwise and 90 degrees clockwise, which acts as a manual valve port for controlling the further communication between the inside of the water inlet pipe and the inner cavity of the additional valve body; an integral column is arranged at a bottom of the inner side of the additional valve body, and is capable of being communicated with the first guide cavity through the plug valve, and the integral column and the additional valve body are connected into a whole.

The device further includes a connecting rod assembly installed at a top of the bucket, where the connecting rod assembly includes a horizontal inserting rod assembled at the top of the bucket, one end, away from the water inlet pipe, of the horizontal inserting rod is hinged with a first connecting rod, and one end, away from the horizontal inserting rod, of the first connecting rod is hinged with a second connecting rod;

a monitoring assembly installed on a top of the additional sealing cover for monitoring the leakage of the additional valve body in real time, where the monitoring assembly includes a scale processor display screen installed on a side of the top of the additional sealing cover, a leak detector is installed in a middle of a bottom of the scale processor display screen, and is inserted on the top of the additional sealing cover, two double leather pads are embedded between a bottom of the additional sealing cover and a top of the additional valve body, and a monitoring ring is clamped between the two double leather pads;

a filtering pipe fitting installed in an inner cavity of the integral column for filtering and purifying water and steam flowing into an inner side of a stepped opening, and intercepting impurities inside the filter pipe fitting, where the filtering pipe fitting includes a double-layer filter core embedded in the inner cavity of the integral column, a built-in guide ring is installed in a middle of an outer surface of the double-layer filter core and is correspondingly installed right below the stepped opening, and is used to guide the water and steam filtered by the double-layer filter core into the stepped opening, and isolate the impurities intercepted inside the interlayer cavity around the built-in guide ring; and a position the built-in guide ring being communicated with an inner wall surface of the double-layer filter core is also provided with a blocking filter mesh for preventing impurities in the innermost cavity of the double-layer filter core from directly entering the stepped opening through the built-in guide ring.

Preferably, a central rod is fixedly connected to a middle of the inner cavity of the integral column and is arranged close to the first guide cavity, an upper part of a right side of the outer surface of the additional valve body is fixedly connected with a water outlet pipe, the stepped opening is arranged in a middle of the bottom of the inner side of the additional valve body and is communicated with the inner cavity of the integral column, the central rod is located between the stepped opening and the first guide cavity.

Preferably, a lead-out cavity is arranged in the additional sealing cover and is close to and is communicated with the water outlet pipe, a built-in wall ring is fixedly connected to a surface of the inner cavity of the integral column and is located between the first guide cavity and the stepped opening, and the built-in wall ring is arranged close to the water outlet pipe relative to the central rod, and is used to slow down the impact of steam and water on the end of the double-layer filter core and play a role in buffering and protecting the end of the double-layer filter core. An edge side, close to a top, of the outer surface of the additional valve body is provided with scales, which is convenient for workers to find out the leakage point more conveniently and intuitively according to the prompt of the scale processor display screen.

Preferably, an end, away from the first connecting rod, of the second connecting rod is hinged with a third connecting rod, and an end, away from the second connecting rod, of the third connecting rod is hinged with a vertical connecting ro, and an end, away from the third connecting rod, of the vertical connecting rod is fixedly connected to a side of the bottom of the additional sealing cover, where a middle part of the third connecting rod is fixedly connected with a plug, and a middle of one end, away from the vertical connecting rod, of the third connecting rod is further hinged with a return guide rod, which is used to abut against the top of the horizontal inserting rod to limit the further narrowing of the included angle between the second connecting rod and the first connecting rod, and to ensure that the top of the third connecting rod and the bottom with the additional scaling cover are kept parallel.

Preferably, a protrusion is arranged on one side of a top of the monitoring ring and is correspondingly arranged just below a leakage detector for being embedded in a middle of a bottom end of the leakage detector, where a buzzer is installed at an inner side of the scale processor display screen.

Preferably, a first sensing column and a second sensing column are installed on a top end, away from the scale processor display screen, of the additional sealing cover, and the second sensing column is arranged close to the water outlet pipe, and detection probes are respectively installed in middles of bottom ends of the first sensing column and the second sensing column, which is used to detect the inner side of the lead-out cavity, and can transmit and display the leakage situation of the inner side of the lead-out cavity on the scale processor display screen in real time, and give an alarm reminder through the buzzer inside the scale processor display screen. The monitoring ring is used for automatic buzzer alarm under the trigger transmission of leakage signals of the monitoring ring, the first sensing column and the second sensing column.

Preferably, a double-screw sealing head is threadedly arranged in the inner cavity of the integral column and is arranged away from the central rod. The central rod is also used to cooperate with the built-in wall ring to limit the installation depth of the double-layer filter core in the inner cavity of the integral column, so as to prevent the built-in guide ring from deviating from the stepped opening due to too deep insertion in the inner cavity of the integral column, a reinforcing ring is installed on an innermost wall surface of the double-layer filter core and is away from the central rod, a screw sleeve is installed on an outer layer wall surface of an inner side of the double-layer filter core, and a maximum outer diameter of the reinforcing ring is smaller than a minimum inner diameter of the screw sleeve, and both of the reinforcing ring and the screw sleeve are integrally designed with the double-layer filter core.

Preferably, an interlayer cavity is arranged between double-layer wall surfaces of the double-layer filter core, in particular to a structure of two sleeved filter sleeves, two fixed ring pieces are installed between the double-layer wall surfaces of the double-layer filter core and are arranged away from the central rod, each of the fixed ring pieces includes a reinforced steel ring, multi-edge blocks are connected on the reinforced steel ring in a circular array, and the multi-edge blocks are fixedly connected between the double-layer wall surfaces of the double-layer filter core, which is used to reinforce the structural support strength of the double-layer filter core away from the central rod.

Preferably, the double-screw sealing head includes a bolt sleeve being screwed at one end of the integral column and being arranged away from the central rod, a sealing ring is sleeved on a surface of one end, facing the central rod, of the bolt sleeve, a bolt head is threadedly installed at a middle of an inner side of the bolt sleeve and is inserted into the inner cavity of the double-layer filter core through the screw sleeve, which is used for plugging the innermost side of the double-layer filter core do not directly flow out, and impurities accumulated in the innermost layer of the double-layer filter core can be discharged only by opening the bolt head on the inner side of the bolt sleeve; and a high-pressure sealing ring is sleeved on an outer surface of the bolt head, which is used to ensure the air tightness of the installation part of the bolt head and the bolt sleeve.

Preferably, lacing seams are formed on the outer surface of the bolt head at equal intervals and are away from the high-pressure sealing ring, an inner wall surface of the reinforcing ring is provided with a plurality of plastic deformation rings at equal intervals, which can expand when heated, and the plastic deformation rings are correspondingly embedded with the lacing seams;

This disclosure provides a leakage monitoring device for a pneumatic drain valve of a steam turbine, which has the following beneficial effects:

Firstly, according to the leakage monitoring device for a pneumatic drain valve of a steam turbine, the leakage monitoring device for a pneumatic drain valve of a steam turbine converts the ultrasonic waves generated by the leakage of the drain valve into a sound audible to human cars, and accurately judges the position of the leakage point according to the operating parameters of the steam system. Through the double leather pads and the leakage detector, the installation interface between the additional sealing cover and the additional valve body is monitored in a ring-shaped fully enclosed manner without dead angle, so as to accurately indicate the leakage point mark on the scale processor display screen, so that workers can accurately find the leakage point on the top edge of the additional valve body according to the mark indication, accurately judge the leakage point, monitoring of the omni-directional leakage detection function of the pneumatic drain valve is comprehensively and thoroughly realized.

Secondly, according to the leakage monitoring device for a pneumatic drain valve of a steam turbine, when the filter pipe fitting need to be completely replaced or reinstalled, the first guide cavity of the passage between the water inlet pipe and the inner cavity of the integral column can be closed by manually twisting the plug valve, so that the complete disassembly and replacement of the filter pipe fitting can be realized without worrying about the leakage and waste of steam and water resources from the inner cavity of the integral column, which provides a convenient active interception function for workers to replace the filter pipe fitting.

Thirdly, according to the leakage monitoring device for a pneumatic drain valve of a steam turbine, after the end of the bolt head being formed with the lacing seams and being completely inserted into the inner side of the double-layer filter core, steam can be used to conduct heat transfer to the plastic deformation ring in the normal use process of the additional valve body. The heated volume of the plastic deformation ring expands, so that the plastic deformation ring expands and deforms, and the volume is further increased, thereby further tightening in the lacing seams, another safety guarantee is added for the air tightness of the installation part of the filter pipe fitting at the inner side of the integral column, and the hidden danger of leakage of the additional valve body here is eliminated.

Fourthly, according to the leakage monitoring device for a pneumatic drain valve of a steam turbine, by independently rotating the bolt head counterclockwise, the impurities in the innermost cavity of the double-layer filter core can be automatically discharged by manually controlling the size of the water flow opened by the plug valve without the condition of taking out the whole filter pipe fitting separately, and under the joint impact of the water flow and the steam carried in the water flow.

Fifthly, according to the leakage monitoring device for a pneumatic drain valve of a steam turbine, by rotating out the bolt sleeve and the bolt head counterclockwise, and manually controlling the size of the gap opened by the plug valve, the total outflow of water flow and steam is controlled, so that the impurities in the innermost cavity and interlayer of the double-layer filter core are impacted together by the impact of water flow and steam, and the unified cleaning of the impurities inside the double-layer filter core is realized. And the operation is convenient and simple, the step of disassembling the filter pipe fitting for separate cleaning is omitted, the airtight hidden danger of loosening between parts caused by assembling and disassembling the filter pipe fitting back and forth in the inner cavity of the integral column is effectively avoided, unnecessary manpower and material resources are saved, and the maintenance difficulty of the monitoring device during use is reduced.

Figure 1:
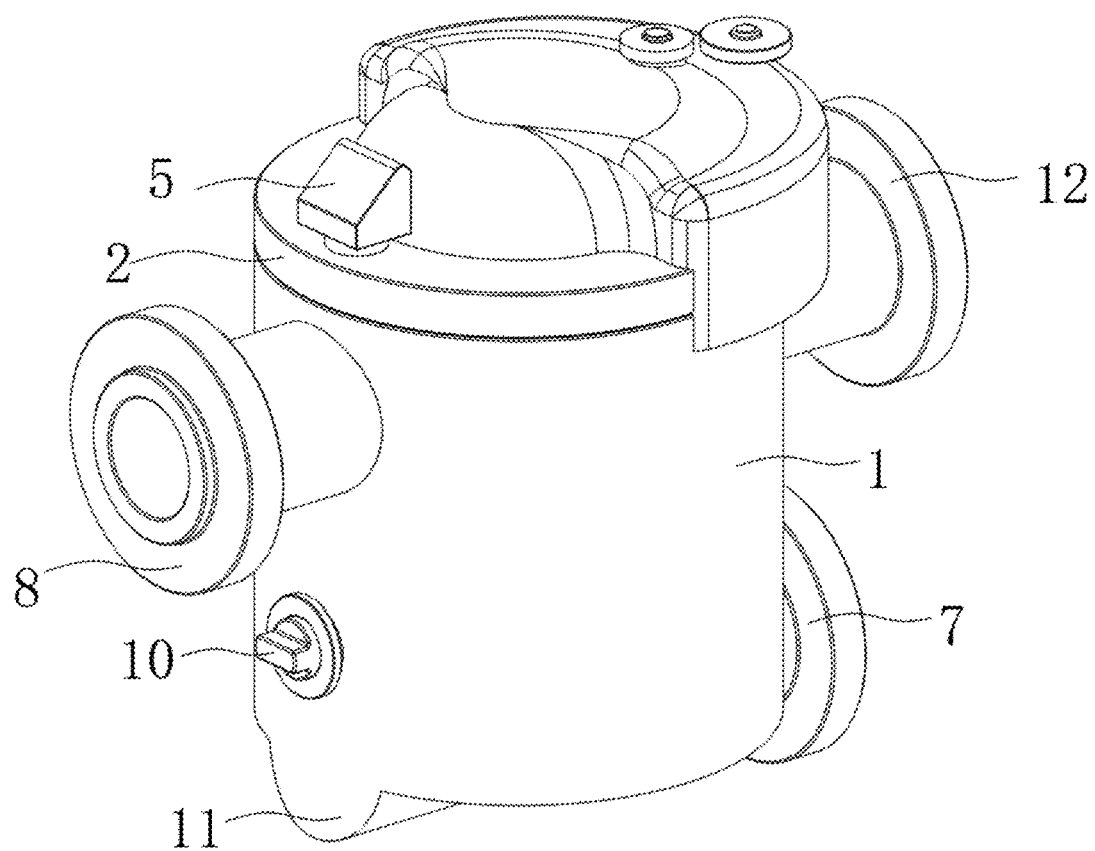
FIG. 1 is a schematic diagram of the external structure of a leakage monitoring device for a pneumatic drain valve of a steam turbine according to the disclosure.

List of reference characters: 1 additional valve body; 2 additional sealing cover; 3 bucket; 4 connecting rod assembly; 41 horizontal inserting rod; 42 first connecting rod; 43 second connecting rod; 44 third connecting rod; 45 vertical connecting rod; 46 plug; 47 return guide rod; 5 monitoring assembly; 51 scale processor display screen; 52 leak detector; 53 monitoring ring; 54 protrusion; 55 first sensing column; 56 second sensing column; 57 detection probe; 7 filtering pipe fitting; 71 double-layer filter core; 72 built-in guide ring; 73 built-in guide ring; 74 reinforcing ring; 75 screw sleeve; 76 interlayer cavity; 77 fixed ring piece; 78 multi-edge block; 731 bolt sleeve; 732 sealing ring; 733 bolt head; 734 high-pressure sealing ring; 735 lacing seam; 736 plastic deformation ring; 8 water inlet pipe; 9 first guide cavity; 10 plug valve; 11 integral column; 12 water outlet pipe; 13 central rod; 14 lead-out cavity; 15 double leather pad; 16 stepped opening; and 17 built-in wall ring.

DETAILED DESCRIPTION OF THE EMBODIMENTS

The disclosure will be described in further detail with reference to the attached drawings and specific embodiments. The embodiments of the disclosure are given for the purpose of illustration and description, and are not exhaustive or limited the disclosure to the disclosed form. Many modifications and variations will be obvious to those skilled in the art. The embodiment is chosen and described in order to better explain the principles and practical application of the disclosure, and to enable those skilled in the art to understand the disclosure and design various embodiments with various modifications that are suited to the specific use.

Figure 2:
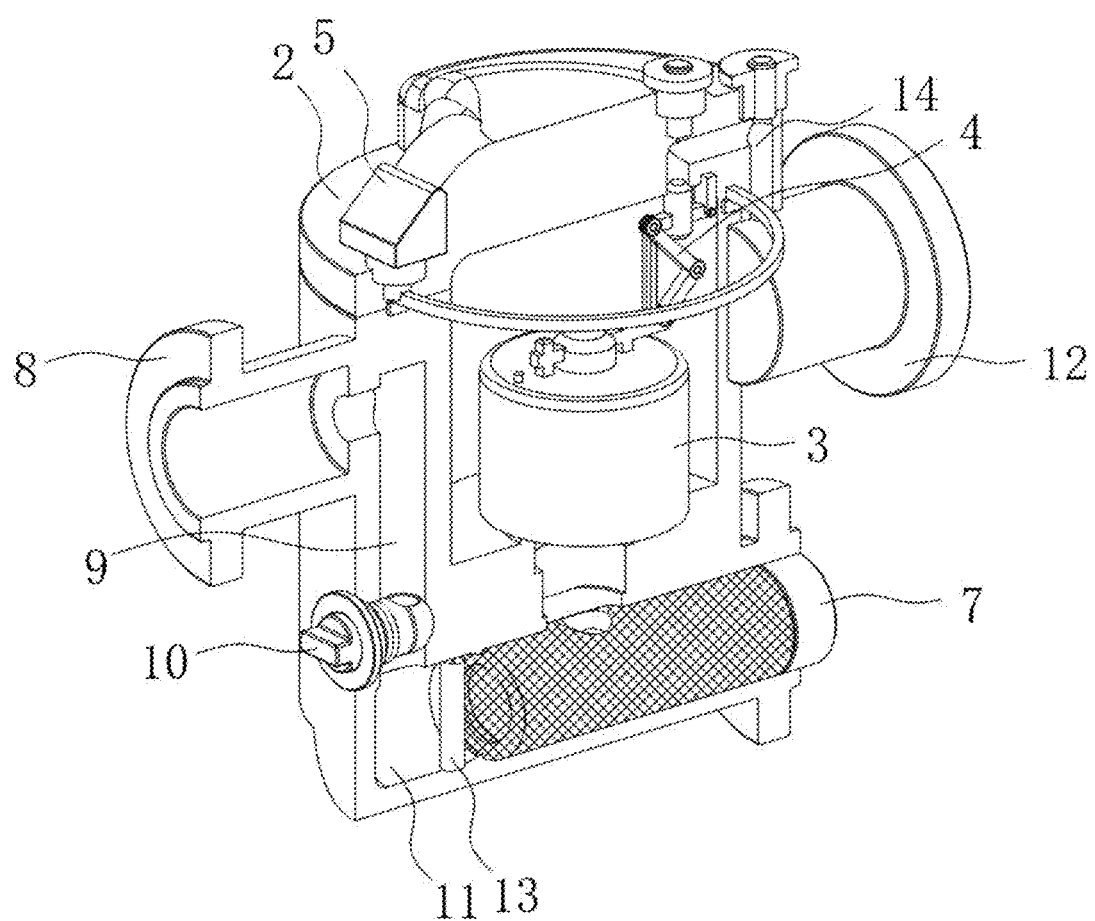
FIG. 2 is a schematic diagram of the internal structure of an additional valve body according to the disclosure.
Figure 3:
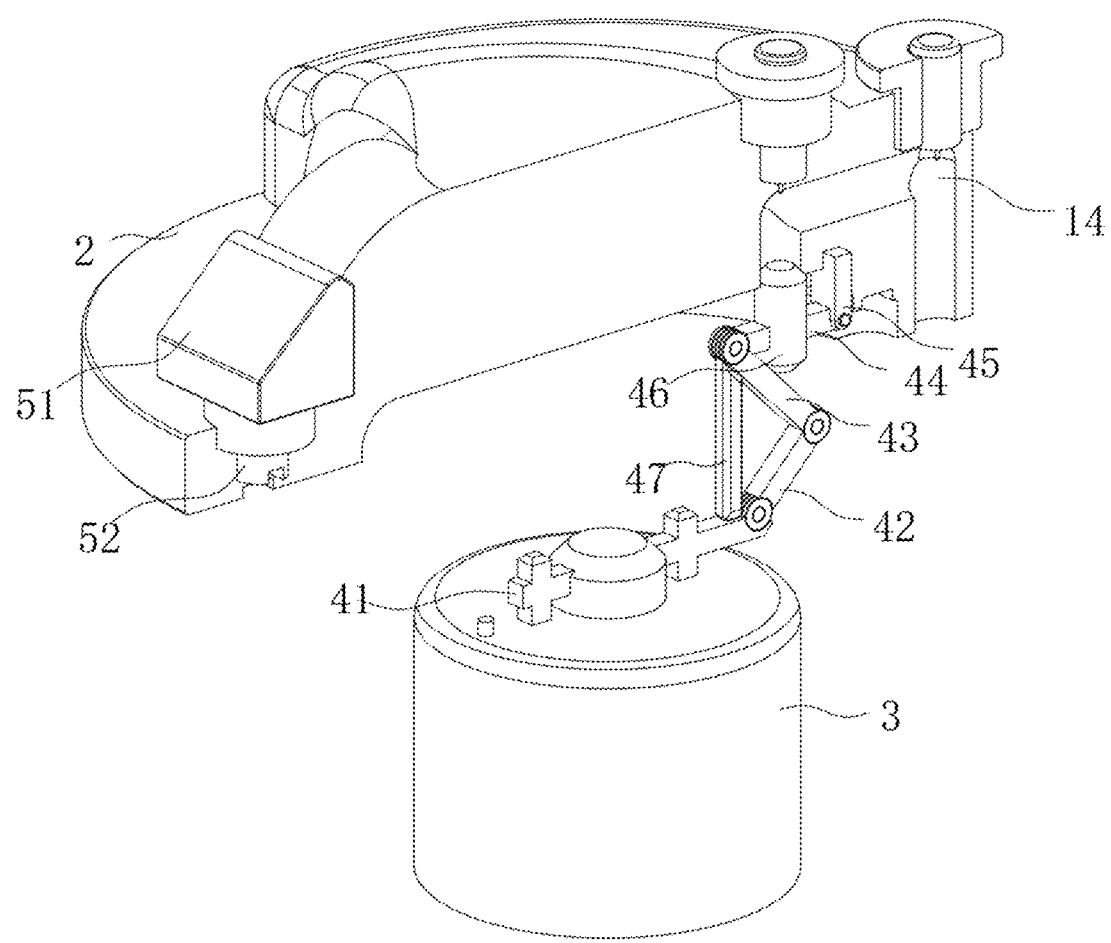
FIG. 3 is a schematic structural diagram of a connecting rod assembly according to the disclosure.
Figure 4:
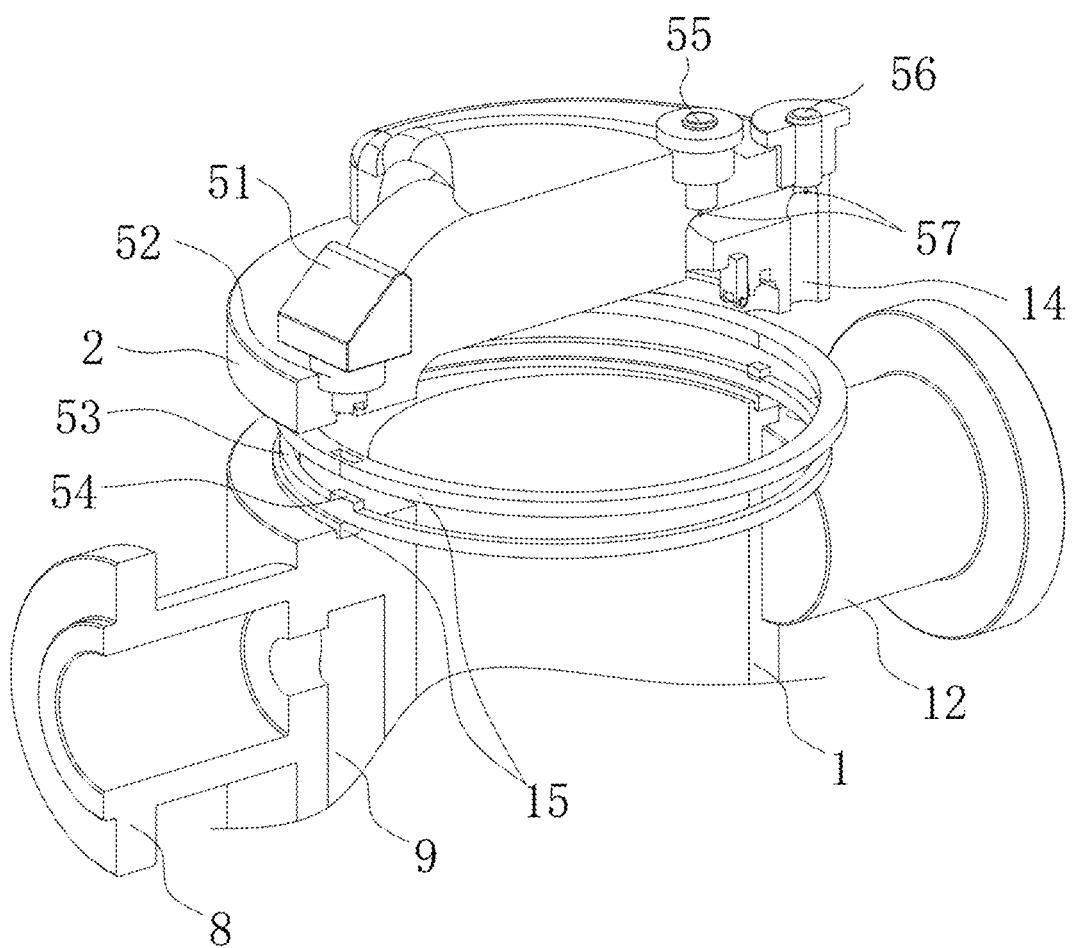
FIG. 4 is a schematic structural diagram of a monitoring assembly according to the disclosure.
Figure 5:
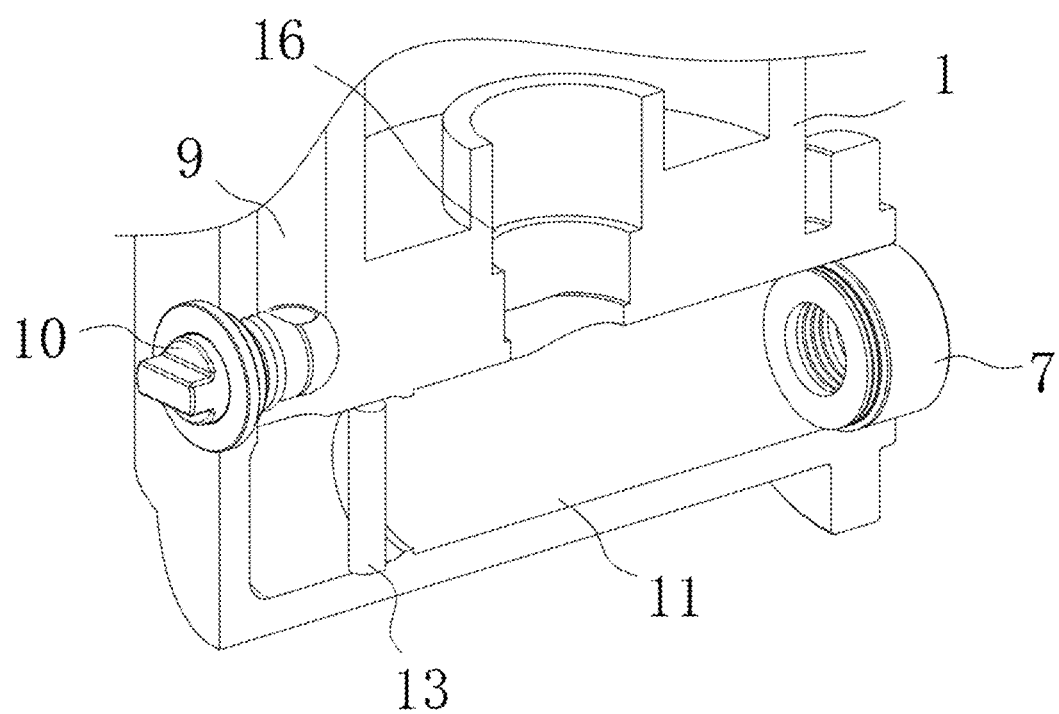
FIG. 5 is a schematic diagram of the partial assembly structure of the plug valve and the additional valve body according to the disclosure.
Figure 6:
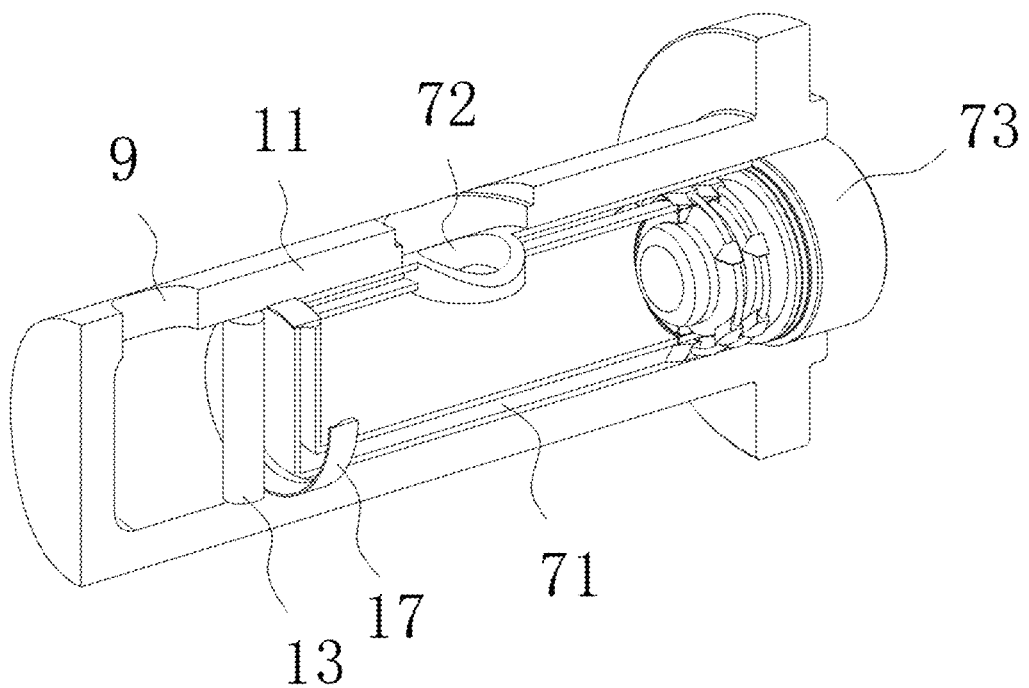
FIG. 6 is a schematic diagram of the internal structure of an integral column according to the disclosure.
Figure 7:
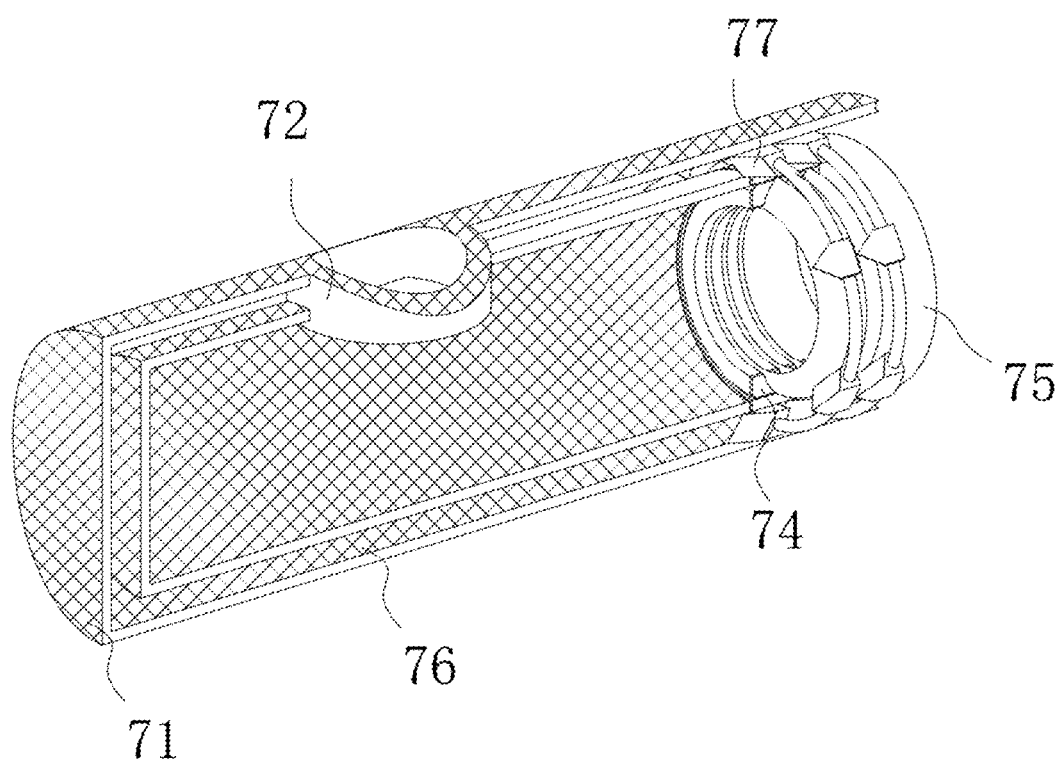
FIG. 7 is a schematic structural diagram of a filter pipe fitting according to the disclosure.
Figure 8:
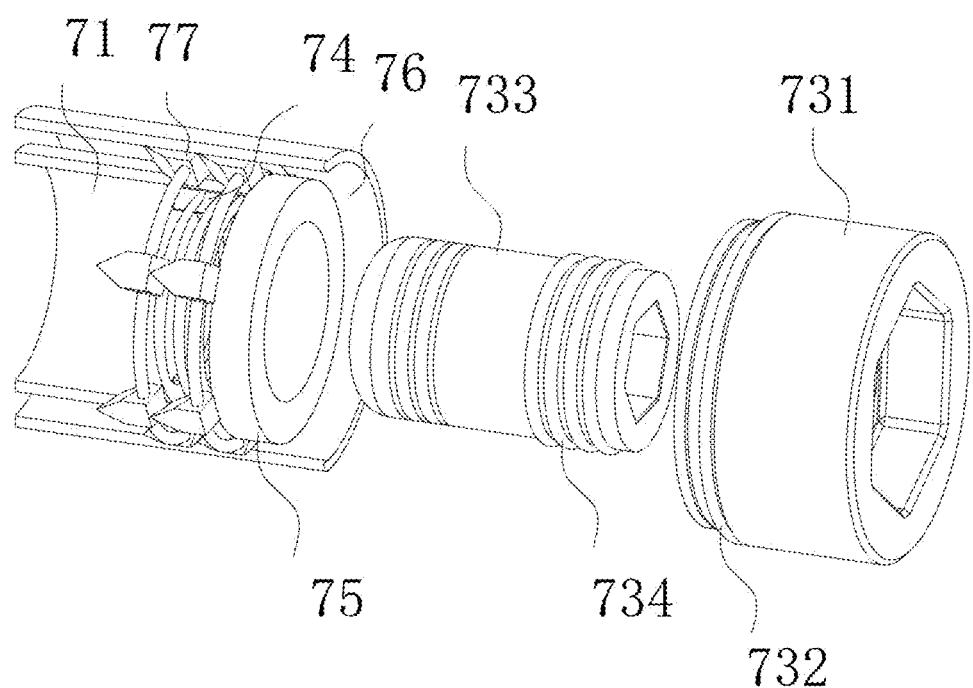
FIG. 8 is a schematic diagram of the disassembly structure of the double-screw sealing head and the double-layer filter core according to the disclosure.
Figure 9:
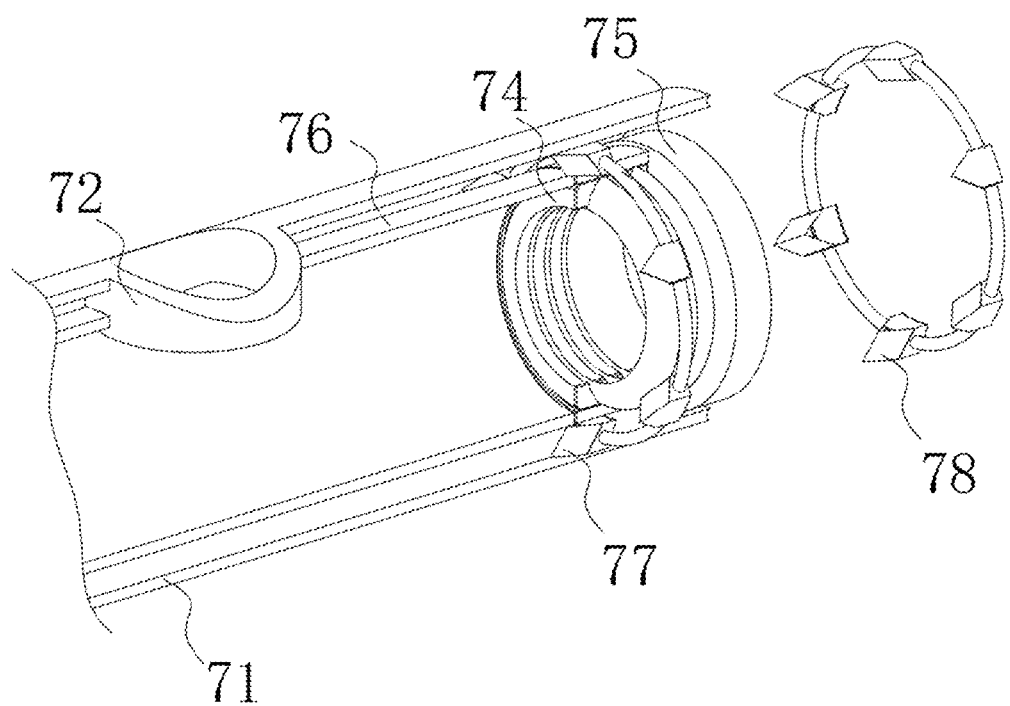
FIG. 9 is a schematic diagram of the disassembly structure of the multi-edge block and the double-layer filter core according to the disclosure.
Figure 10:
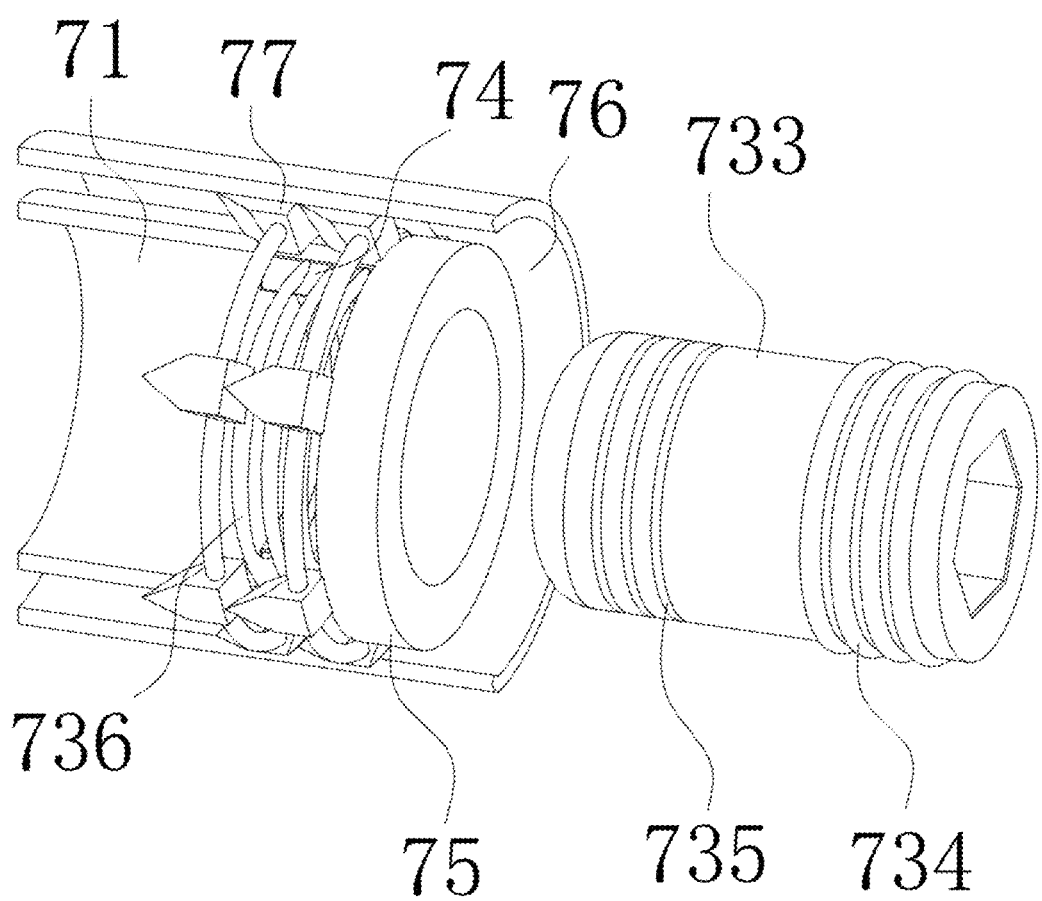
FIG. 10 is a schematic structural diagram of a bolt head and a plastic deformation ring according to the disclosure.

In the first embodiment, as shown in FIGS. 1 to 10, the disclosure provides a technical scheme: a leakage monitoring device for a pneumatic drain valve of a steam turbine is provided and includes an additional valve body 1. A top flange of the additional valve body 1 is provided with an additional sealing cover 2, a bucket 3 is installed in a middle of an inner side of the additional valve body 1. An upper part of a left side of an outer surface of the additional valve body 1 is fixedly connected with a water inlet pipe 8, a first guide cavity 9 is vertically arranged on the inner side of the additional valve body 1 and close to the water inlet pipe 8 and is communicated with the water inlet pipe 8, a plug valve 10 is rotatably installed at a lower left side of the outer surface of the additional valve body 1, and a high-pressure sealing ring is installed in a rotating connection position of the plug valve 10 and the additional valve body 1, which acts as a manual valve port for controlling the further communication between the inside of the water inlet pipe and the inner cavity of the additional valve body. An integral column 11 is arranged at a bottom of the inner side of the additional valve body 1, and is capable of being communicated with the first guide cavity 9 through the plug valve 10, and the integral column 11 and the additional valve body 1 are connected into a whole.

The device further includes a connecting rod assembly 4 installed at a top of the bucket 3. The connecting rod assembly 4 includes a horizontal inserting rod 41 assembled at the top of the bucket 3, one end, away from the water inlet pipe, of the horizontal inserting rod 41 is hinged with a first connecting rod 42, and one end, away from the horizontal inserting rod 41, of the first connecting rod 42 is hinged with a second connecting rod 43.

The device further includes a monitoring assembly 5 installed on a top of the additional sealing cover 2. The monitoring assembly 5 includes a scale processor display screen 51 installed on a side of the top of the additional sealing cover 2, a leak detector 52 is installed in a middle of a bottom of the scale processor display screen 51, and is inserted on the top of the additional sealing cover 2, two double leather pads 15 are embedded between a bottom of the additional sealing cover 2 and a top of the additional valve body 1, and a monitoring ring 53 is clamped between the two double leather pads 15, so that the leakage point can be accurately judged.

The device further includes a filtering pipe fitting 7 installed in an inner cavity of the integral column 11 for filtering and purifying water and steam flowing into an inner side of a stepped opening 16, and intercepting impurities inside the filter pipe fitting 7. The filtering pipe fitting 7 includes a double-layer filter core 71 embedded in the inner cavity of the integral column 11, a built-in guide ring 72 is installed in a middle of an outer surface of the double-layer filter core 71 and is correspondingly installed right below the stepped opening 16, and is used to isolate the impurities intercepted inside the interlayer cavity 76 around the built-in guide ring 72. And a position the built-in guide ring 72 being communicated with an inner wall surface of the double-layer filter core 71 is also provided with a blocking filter mesh for preventing impurities in the innermost cavity of the double-layer filter core 71 from directly entering the stepped opening 16 through the built-in guide ring 72.

When in use, the device converts the ultrasonic waves generated by the leakage of the drain valve into a sound audible to human ears, and accurately judges the position of the leakage point according to the operating parameters of the steam system. Through the double leather pads 15 and the leakage detector 52, the installation interface between the additional sealing cover 2 and the additional valve body 1 is monitored in a ring-shaped fully enclosed manner without dead angle, so as to accurately indicate the leakage point mark on the scale processor display screen 51, so that workers can accurately find the leakage point on the top edge of the additional valve body 1 according to the mark indication, accurately judge the leakage point.

The second embodiment, on the basis of the first embodiment, is shown in FIGS. 1 to 4, a central rod 13 is fixedly connected to a middle of the inner cavity of the integral column 11 and is arranged close to the first guide cavity 9, an upper part of a right side of the outer surface of the additional valve body 1 is fixedly connected with a water outlet pipe 12, the stepped opening 16 is arranged in a middle of the bottom of the inner side of the additional valve body 1 and is communicated with the inner cavity of the integral column 11, the central rod 13 is located between the stepped opening 16 and the first guide cavity 9. A lead-out cavity 14 is arranged in the additional sealing cover 2 and is close to and is communicated with the water outlet pipe 12, a built-in wall ring 17 is fixedly connected to a surface of the inner cavity of the integral column 11 and is located between the first guide cavity 9 and the stepped opening 16, and the built-in wall ring 17 is arranged close to the water outlet pipe 12 relative to the central rod 13, and is used to slow down the impact of steam and water on the end of the double-layer filter core 71 and play a role in buffering and protecting the end of the double-layer filter core 71. An edge side, close to a top, of the outer surface of the additional valve body 1 is provided with scales, which is convenient for workers to find out the leakage point more conveniently and intuitively according to the prompt of the scale processor display screen 51. It provides a convenient active interception function for workers to replace the filter pipe fitting 7. An end, away from the first connecting rod 42, of the second connecting rod 43 is hinged with a third connecting rod 44, and an end, away from the second connecting rod 43, of the third connecting rod 44 is hinged with a vertical connecting rod 45, and an end, away from the third connecting rod 44, of the vertical connecting rod 45 is fixedly connected to a side of the bottom of the additional sealing cover 2, where a middle part of the third connecting rod 44 is fixedly connected with a plug 46, and a middle of one end, away from the vertical connecting rod 45, of the third connecting rod 44 is further hinged with a return guide rod 47. The plug 46 can be smoothly inserted and plugged at the water inlet of the lead-out cavity cavity 14, so as to avoid easy leakage of steam.

A protrusion 54 is arranged on one side of a top of the monitoring ring 53 and is correspondingly arranged just below a leakage detector 52 for being embedded in a middle of a bottom end of the leakage detector 52, where a buzzer is installed at an inner side of the scale processor display screen 51. A first sensing column 55 and a second sensing column 56 are installed on a top end, away from the scale processor display screen 51, of the additional sealing cover 2, and the second sensing column 56 is arranged close to the water outlet pipe 12, and detection probes 57 are respectively installed in middles of bottom ends of the first sensing column 55 and the second sensing column 56.

When in use, through the arrangement of the leakage detector 52, the monitoring ring 53, the first sensing column 55, the second sensing column 56 and the detection probe 57, steam enters the bucket 3 from the water inlet pipe 8, the first guide cavity 9, the integral column 11 and the stepped opening 16. The bucket 3 is pushed upward by steam, which drives the plug 46 to block the lead-out cavity 14 and intercept the steam between the additional valve body 1 and the additional sealing cover 2. When steam leaks from a interface between the additional valve body 1 and the additional sealing cover 2, ultrasonic waves are generated when the additional valve body 1 leaks, and the monitoring ring 53 helps the scale processor display screen 51 to capture the ultrasonic waves and convert the ultrasonic waves into a sound audible to human ears, so as to accurately judge a position of a leakage point according to operating parameters of a steam system; at this time, the first sensing column 55, the second sensing column 56, the detection probes 57 and the monitoring ring 53 simultaneously transmit signals to a control module in the scale processor display screen 51, so as to make the buzzer give an alarm prompt, and meanwhile, a scale number with a top leakage adjustment of the additional valve body 1 is displayed on the scale processor display screen 51, so as to find a corresponding leakage point in time.

When the filter pipe fitting 7 need to be completely replaced or reinstalled, the first guide cavity 9 of the passage between the water inlet pipe 8 and the inner cavity of the integral column 11 can be closed by manually twisting the plug valve 10, so that the complete disassembly and replacement of the filter pipe fitting 7 can be realized without worrying about the leakage and waste of steam and water resources from the inner cavity of the integral column 11, which provides a convenient active interception function for workers to replace the filter pipe fitting 7.

Therefore, the monitoring device can quickly identify the leakage fault and position of the pneumatic drain valve and give an alarm, so that workers can quickly make adjustments according to the prompts and give an alarm, avoiding steam waste and avoiding the damage of the pneumatic drain valve caused by the failure to adjust in time.

The third embodiment, based on the first and second embodiments, as shown in FIGS. 6 to 10, a double-screw scaling head 73 is threadedly arranged in the inner cavity of the integral column 11 and is arranged away from the central rod 13, a reinforcing ring 74 is installed on an innermost wall surface of the double-layer filter core 71 and is away from the central rod 13, a screw sleeve 75 is installed on an outer layer wall surface of an inner side of the double-layer filter core 71, and a maximum outer diameter of the reinforcing ring 74 is smaller than a minimum inner diameter of the screw sleeve 75, and both of the reinforcing ring 74 and the screw sleeve 75 are integrally designed with the double-layer filter core 71.

An interlayer cavity 76 is arranged between double-layer wall surfaces of the double-layer filter core 71, in particular to a structure of two sleeved filter sleeves, two fixed ring pieces 77 are installed between the double-layer wall surfaces of the double-layer filter core 71 and are arranged away from the central rod 13, each of the fixed ring pieces 77 includes a reinforced steel ring, multi-edge blocks 78 are connected on the reinforced steel ring in a circular array, and the multi-edge blocks 78 are fixedly connected between the double-layer wall surfaces of the double-layer filter core 71. The multi-edge blocks 78 can guide the impurities accumulated between the double-layer wall surfaces to the end away from the central rod 13, without blocking the impurities, and will not hinder the tendency of the impurities to move and collect to the end away from the central rod 13 under the impact of water and steam.

The double-screw scaling head 73 includes a bolt sleeve 731 being screwed at one end of the integral column 11 and being arranged away from the central rod 13, a scaling ring 732 is sleeved on a surface of one end, facing the central rod 13, of the bolt sleeve 731, a bolt head 733 is threadedly installed at a middle of an inner side of the bolt sleeve 731 and is inserted into the inner cavity of the double-layer filter core 71 through the screw sleeve 75, which is used for plugging the innermost side of the double-layer filter core 71 do not directly flow out, and impurities accumulated in the innermost layer of the double-layer filter core 71 can be discharged only by opening the bolt head 733 on the inner side of the bolt sleeve 731; and a high-pressure sealing ring 734 is sleeved on an outer surface of the bolt head 733, which is used to ensure the air tightness of the installation part of the bolt head 733 and the bolt sleeve 731. Lacing seams 735 are formed on the outer surface of the bolt head 733 at equal intervals and are away from the high-pressure sealing ring 734, an inner wall surface of the reinforcing ring 74 is provided with a plurality of plastic deformation rings 736 at equal intervals, which can expand when heated, and the plastic deformation rings 736 are correspondingly embedded with the lacing seams 735.

When in use, after the end of the bolt head 733 being formed with the lacing seams 735 and being completely inserted into the inner side of the double-layer filter core 71, steam can be used to conduct heat transfer to the plastic deformation ring 736 in the normal use process of the additional valve body 1. The heated volume of the plastic deformation ring 736 expands, so that the plastic deformation ring 736 expands and deforms, and the volume is further increased, thereby further tightening in the lacing seams 735, another safety guarantee is added for the air tightness of the installation part of the filter pipe fitting 7 at the inner side of the integral column 11, and the hidden danger of leakage of the additional valve body 1 here is eliminated.

Meanwhile, by independently rotating the bolt head 733 counterclockwise, the impurities in the innermost cavity of the double-layer filter core 71 can be automatically discharged by manually controlling the size of the water flow opened by the plug valve 10 without the condition of taking out the whole filter pipe fitting 7 separately, and under the joint impact of the water flow and the steam carried in the water flow.

Similarly, the bolt sleeve 731 and the bolt head 733 are rotated out counterclockwise, and the size of the gap is opened via manually controlling the plug valve 10, the total outflow of water flow and steam is controlled, so that the impurities in the innermost cavity and interlayer of the double-layer filter core 71 are impacted together by the impact of water flow and steam, and the unified cleaning of the impurities inside the double-layer filter core 71 is realized. And the operation is convenient and simple, the step of disassembling the filter pipe fitting 7 for separate cleaning is omitted, the airtight hidden danger of loosening between parts caused by assembling and disassembling the filter pipe fitting 7 back and forth in the inner cavity of the integral column 11 is effectively avoided, unnecessary manpower and material resources are saved, and the maintenance difficulty of the monitoring device during use is reduced.

Obviously, the described embodiment is only a part of the embodiment of the disclosure, not all of the embodiment. Based on the embodiments in the disclosure, all other embodiments obtained by those skilled in this field and related fields without creative efforts should belong to the protection scope of the disclosure. Structures, devices and operation methods not specifically described and explained in the disclosure, unless specifically described and limited, are implemented by conventional means in this field.

What is claimed is:

1. A leakage monitoring device for a pneumatic drain valve of a steam turbine, comprising a valve body, wherein:
    a top flange of the valve body is provided with a sealing cover, a bucket is installed in a middle of an inner side of the valve body, an upper part of a left side of an outer surface of the valve body is fixedly connected with a water inlet pipe, a first guide cavity is vertically arranged on the inner side of the valve body and is communicated with the water inlet pipe, a plug valve is rotatably installed at a lower left side of the outer surface of the valve body, and a high-pressure sealing ring is installed in a connection position of the plug valve and the valve body, an integral column is arranged at a bottom of the inner side of the valve body, and is capable of being communicated with the first guide cavity through the plug valve, and the integral column is integrally formed with the valve body;
    wherein the device further comprises a connecting rod assembly installed at a top of the bucket, wherein the connecting rod assembly comprises a horizontal inserting rod assembled at the top of the bucket, one end of the horizontal inserting rod is hinged with a first end of a first connecting rod, and a second end of the first connecting rod is hinged with a first end of a second connecting rod;
    a monitoring assembly installed on a top of the sealing cover, wherein the monitoring assembly comprises a scale processor display screen installed on a side of the top of the sealing cover, a leak detector is installed in a middle of a bottom of the scale processor display screen, and is inserted in the sealing cover, two double leather pads are embedded between a bottom of the sealing cover and a top of the valve body, and a monitoring ring is clamped between the two double leather pads;
    a filtering pipe fitting installed in an inner cavity of the integral column for filtering and purifying water and steam flowing into an inner side of a stepped opening, wherein the filtering pipe fitting comprises a double-layer filter core embedded in the inner cavity of the integral column, a guide ring is installed in a middle of an outer surface of the double-layer filter core and is installed directly below the stepped opening, and a blocking filter mesh is provided on a part of the guide ring that is communicated with an inner wall surface of the double-layer filter core;

a central rod is fixedly connected to a middle of the inner cavity of the integral column, an upper part of a right side of the outer surface of the valve body is fixedly connected with a water outlet pipe, the stepped opening is arranged in a middle of the bottom of the inner side of the valve body and is communicated with the inner cavity of the integral column, the central rod is located between the stepped opening and the first guide cavity;

a lead-out cavity is arranged in the sealing cover and is communicated with the water outlet pipe, a wall ring is fixedly connected to a surface of the inner cavity of the integral column and is located between the first guide cavity and the stepped opening, an edge side of the outer surface of the valve body is engraved with scales;

a second end of the second connecting rod is hinged with a first end of a third connecting rod, and a second end of the third connecting rod is hinged with a first end of a vertical connecting rod, and a second end of the vertical connecting rod is fixedly connected to a side of the bottom of the sealing cover, wherein a middle part of the third connecting rod is fixedly connected with a plug, and a middle of the first end of the third connecting rod is further hinged with a return guide rod;

a protrusion is arranged on one side of a top of the monitoring ring and is arranged directly below a leakage detector to be embedded in a middle of a bottom end of the leakage detector, wherein a buzzer is installed at an inner side of the scale processor display screen;

a first sensing column and a second sensing column are installed on a top end of the sealing cover, and detection probes are respectively installed in middles of bottom ends of the first sensing column and the second sensing column;

a double-screw sealing head is threadedly arranged in the inner cavity of the integral column, a reinforcing ring is installed on an innermost wall surface of the double-layer filter core, a screw sleeve is installed on an outer layer wall surface of an inner side of the double-layer filter core, and a maximum outer diameter of the reinforcing ring is smaller than a minimum inner diameter of the screw sleeve, and both of the reinforcing ring and the screw sleeve are integrally formed with the double-layer filter core;

an interlayer cavity is arranged between double-layer wall surfaces of the double-layer filter core, two fixed ring pieces are installed between the double-layer wall surfaces of the double-layer filter core, each of the fixed ring pieces comprises a reinforced steel ring, multi-edge blocks are connected on the reinforced steel ring in a circular array, and the multi-edge blocks are fixedly connected between the double-layer wall surfaces of the double-layer filter core;

the double-screw sealing head comprises a bolt sleeve to be screwed at one end of the integral column, a sealing ring is sleeved on a surface of one end, facing the central rod, of the bolt sleeve, a bolt head is threadedly installed at a middle of an inner side of the bolt sleeve and is inserted into the inner cavity of the double-layer filter core through the screw sleeve, and a high-pressure sealing ring is sleeved on an outer surface of the bolt head;

lacing seams are formed on the outer surface of the bolt head at equal intervals, an inner wall surface of the reinforcing ring is provided with a plurality of plastic deformation rings at equal intervals, and the plastic deformation rings are correspondingly embedded with the lacing seams;

the monitoring ring is configured to monitor and capture the ultrasonic waves generated due to a steam leaking from an interface between the valve body and the sealing cover and determine a position of a leakage point according to operating parameters of a steam system; wherein, after the position of a leakage point is determined, the first sensing column, the second sensing column, the detection probes and the monitoring ring simultaneously transmit signals to a control module in the scale processor display screen, so as to make the buzzer give an alarm prompt, and meanwhile, a scale number with a top leakage adjustment of the valve body is displayed on the scale processor display screen, so as to find a corresponding leakage point in time.

* * * * *